Aug. 10, 1954   D. T. MOWBRAY   2,685,756
FISHHOOK COVER
Filed March 15, 1951
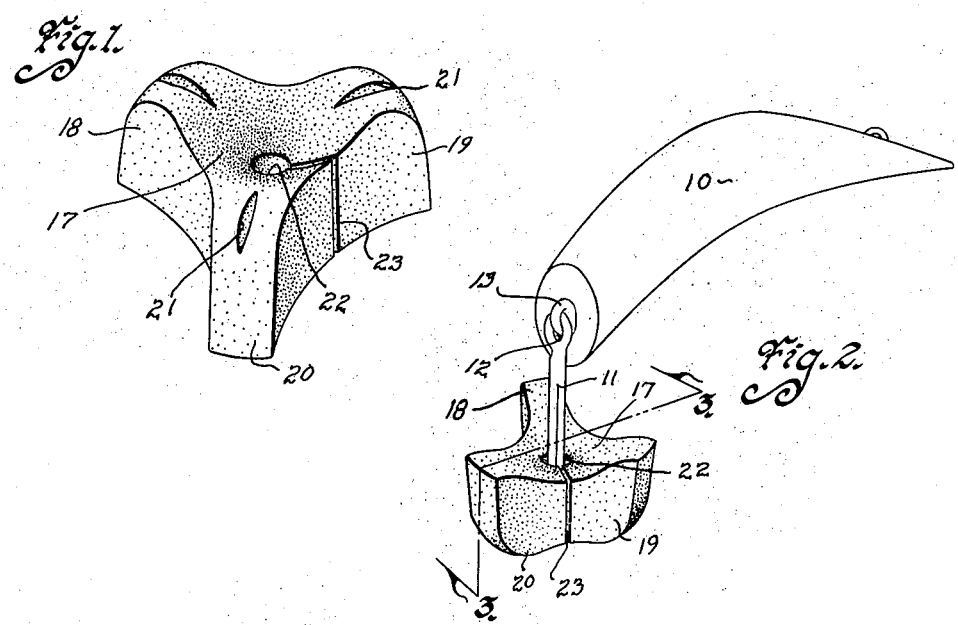
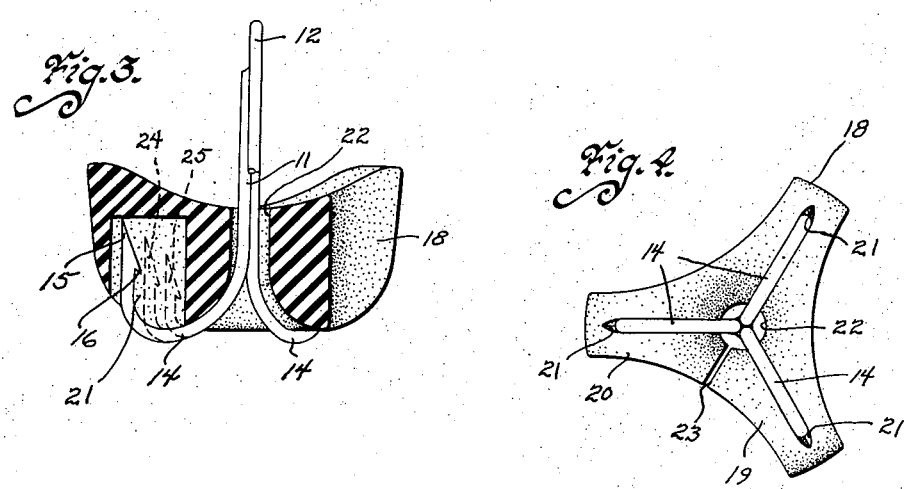
Inventor
Douglas T. Mowbray
by M. Talbert Dick
Attorney
Witness
Edward P. Seeley

UNITED STATES PATENT OFFICE 2,685,756

FISHHOOK COVER

Douglas T. Mowbray, Waterloo, Iowa

Application March 15, 1951, Serial No. 215,742

1 Claim. (Cl. 43—54.5)

My invention relates to the art of fishing tackle gear. Specifically, I have invented a cover for fish hook points and barbs that is adapted to cover ismultaneously the points and barbs of multiple point fishing hooks when not in use by fishermen.

There are many times when a fisherman does not wish to carry a bulky tackle box with him. When he is wading in a stream or fishing close to his living quarters, or for a short time, a tackle box is unnecessarily combersome. Nevertheless, it is desirable for the fisherman to provide himself with a considerable variety of fishing lures or plugs. If the tackle box is not used, the fishing lures or plugs are usually carried in a pocket of the fisherman's clothing. Fishing plugs so carried quickly become snagged in the clothing and if several plugs are attempted to be carried in a single pocket, they also become tangled with each other. It is very difficult when the plugs become tangled with each other or snagged in the clothing to get the plug that the fisherman desires to use free from the other objects with which it has become engaged. Also, of course, when the plugs are loose in the pockets with the hooks unprotected, the hooks frequently gouge and damage the painted bodies of the other plugs and even more unfortunate, the hooks themselves may become bent or dulled.

Most of the difficulties of carrying fishing plugs in the bulk in clothing pockets is also true of carrying them in bulk in a tackle box. It may even be said that the tackle box offers greater hazards in that there are often other objects in the box, such as reels and the like, which can bend or damage the hooks sufficiently that repair work is necessary before they can be used. Also, of course, as the number of plugs carried in the tackle box is usually considerable, it is relatively easy for a large number of plugs to become completely entangled with each other by their hooks and a fisherman often spends nearly as much time disentangling his plugs as he does fishing. Some of the difficulties of the tackle box have been more or less solved by having slotted hook receiving protectors built into the tackle box. Such hook aligning arrangements, however, require that the tackle box be considerably larger than otherwise would be the case. Also, of course, whenever the plugs are removed from the box, the hook protector must be left behind.

Perhaps the most important reason for covering the points and barbs of fishing hooks is to protect the fisherman from becoming snagged on the points and barbs. Anyone who has experienced the difficulties of exchanging plugs on a line will appreciate what an advantage an easily mounted hook cover would be during this operation. When plugs are being changed, the fisherman holds his rod and reel and then releases the "safety pin" on the end of his leader, removes the old plug, puts on a new one and finally resecures the "safety pin." As a matter of practical consideration, almost every fisherman has experienced at least some minor jabs which are annoying and perhaps even dangerous as a possible source of infection. A hook cover that is easily slipped on and off a hook could be used to great advantage during this plug changing operation. Before the removal of the plug on the line is started, the hooks would be covered. The new lure that is to be placed on the line would have its hooks covered already. With the hooks covered, the lures could be handled as though no hooks were present. Once the change had been effected, the new plug would be stripped of its hook covers and be ready for use.

It is the principal object of my invention to provide a fish hook cover that will make changing of lures safe and quick.

It is a further object of my invention to provide a fish hook cover that protects the hook against dulling or bending blows.

It is a further object of my invention to provide a fish hook cover that prevents a plurality of hooks or a plurality of lures carrying hooks from becoming entangled with each other.

It is the further object of my invention to provide a fish hook cover that permits plugs to be carried in the pocket without having hooks of the plugs become snagged in the clothing.

It is a further object of my invention to provide a fish hook cover that prevents the paint of a plurality of plugs in contact with each other from being damaged by the hooks of each other.

It is a further object of my invention to provide a fish hook cover that resists disengagement from a fish hook secured to an artificial lure as the lure is withdrawn from a storage place.

It is a further object of my invention to provide a fish hook cover that is easily placed on and removed from a fish hook.

It is a further object of my invention to provide a fish hook cover than can simultaneously cover the points and barbs of multiple point hooks such as treble hooks and the like.

It is a further object of my invention to provide a fish hook cover that is durable in use, refined in appearance and economical to manufacture.

A still further object of my invention is to provide a fish hook cover that adapts itself to a variety of sizes of fishing hooks.

These and other objects will be apparent to those skilled in the art.

My invention consists in the construction, arrangement, and combination of the various parts of the device, whereby the objects contemplated are attained as hereinafter more fully set forth, pointed out in my claim, and illustrated in the accompanying drawings, in which:

Fig. 1 is an enlarged perspective bottom view of my fish hook cover,

Fig. 2 is a perspective view of my fish hook cover mounted on a fish hook secured to an artificial lure, Fig. 3 is an enlarged cross-sectional view of my fish hook cover taken on the line 3—3 of Fig. 2; broken lines illustrate how different size hooks are accommodated by a single size of cover, and Fig. 4 is a bottom view of my fish hook cover mounted on a fish hook.

Referring to the drawings, I have used the numeral 10 to designate a fishing plug having a three pronged or treble hook composed of a shank member 11 having an eye 12 on its upper end. The eye 12 of the fishing hook is engaged with a similar eye 13 that is rigidly secured to the plug in any suitable manner and as is well known in the art. The shank 11 branches into three hook portions, all designated 14, with a point 15 having a barb 16 thereon at the free end of each hook portion. My cover is made from any suitable material that is preferably resilient as rubber or the like and is composed of a central portion designated 17 from which project three legs designated 18, 19 and 20 respectively. The oval wells 21 or their equivalent are formed in each of the three legs and a hole designated 22 extends through the center of the body portion 17. The wells 21 are narrower than the thickness of the material from which a fishing hook is made so that the sides of the oval openings 21 exert a frictional gripping pressure on the portion of the hook inserted therein as shown in Fig. 4. The wells are made as long as possible with regard to the size of the particular cover so that a variety of different size hooks, as shown in Fig. 3 by the dotted hooks designated 24 and 25 and hook 14, may be accommodated by any one size of cover. By reason of this construction that permits one size of cover to accommodate a variety of hooks only two or three sizes of guards would provide a range of guards that would accommodate practically all the hooks in common use by plug fishermen. This fact reduces the number of molds required for manufacture. A slot or passageway designated 23 connects the hole 22 throughout its length with the outside edge of body portion 17 between any two of the legs and as illustrated in Fig. 1 between the legs 19 and 20.

My hook cover is very simple to use. To cover a hook, the fisherman exerts a compression force on either leg adjacent the slot and the third leg. This compression force causes a movement of either of the legs adjacent the slot 23 toward the third leg which opens the slot 23 to permit the cover to be slipped over the shank portion of a hook. The oval cavity wells 21 are then aligned over the hook points, and the cover is slidably moved to cause the cover wells 21 to completely surround the points and barbs of the hooks as shown in Fig. 3. To remove the cover, a reverse procedure is followed. Although I have shown the cover made from a resilient material such as rubber as the preferred form, it could be made from less resilient material. In the event that a relatively rigid material is used, the portion 17 could be made in two parts resiliently secured together as by a spring loaded hinge or the like. If the cover were made of a solid piece of relatively rigid material, the slot 23 would have to be wide enough to permit the shank of a hook to pass through it without spreading as suggested for the resilient models. The wells or cavities 21 could be formed in a resilient insert in the legs if resilient characteristics are desired but available rubber or the like limited in quantities.

My fish hook cover is purposely made to completely fill the hook portion of the treble hook commonly used on artificial lures as shown in Fig. 3 so that there is no possibility of two hooks which are provided with my covers from becoming entangled with each other. It is also clear that a fishing hook provided with one of these covers may be safely carried in a clothing pocket without danger of damaging the hook, clothing or the fisherman. Since the cover must be moved upwardly on the hook shank in order to disengage it, the cover will not be accidently disengaged from the hook as the lure is withdrawn from the pocket or other storage place prior to use. Obviously with the hook points and barbs covered, they cannot be damaged as by bending or peening from blows. This cover is so easily installed or removed as to make it very practical for use during plug changing operations as described in the specification above.

Some changes may be made in the construction and arrangement of my fish hook cover without departing from the real spirit and purpose of my invention, and it is my intention to cover by my claim, any modified forms of structure or use of mechanical equivalents which may be reasonably included within their scope.

I claim:

In a fish hook cover, a resilient central body portion having a hole extending through it, said central body portion having a slot opening therein which extends from the side thereof to the hole therein; said slot extending also from the top to the bottom of said central body portion so as to provide a passageway from the hole to the side of said central body portion throughout its thickness, and at least one resilient leg secured to said central body portion; said leg having a well opening therein that extends upwardly toward, but not to its top so that a fish hook point may engage the bottom of the well; said cover being of such a thickness that a portion of a hook as it curves from its shank portion to its point and barb structure will be engaged by said cover when the point and barb of a hook are in the opening in said leg.

References Cited in the file of this patent

UNITED STATES PATENTS

| Number | Name | Date |
| --- | --- | --- |
| 2,204,185 | Lougheed | June 11, 1940 |
| 2,482,881 | Sonner | Sept. 27, 1949 |
| 2,616,209 | Ploen | Nov. 4, 1952 |

FOREIGN PATENTS

| Number | Country | Date |
| --- | --- | --- |
| 109,618 | Sweden | Jan. 25, 1944 |
| 802,962 | Germany | Feb. 26, 1951 |